United States Patent [19]

Yoshikawa

[11] Patent Number: 4,957,470

[45] Date of Patent: Sep. 18, 1990

[54] VALVE OPERATING SYSTEM FOR ENGINE

[75] Inventor: Masaaki Yoshikawa, Iwata, Japan

[73] Assignee: Yamaha Hatsudoki Kabushiki Kaisha, Iwata, Japan

[21] Appl. No.: 390,606

[22] Filed: Aug. 7, 1989

[30] Foreign Application Priority Data

Aug. 8, 1988 [JP] Japan ................................ 63-197739

[51] Int. Cl.[5] ................................................ F16H 7/08

[52] U.S. Cl. ..................................... 474/101; 474/134

[58] Field of Search ............... 474/101, 109, 111, 113, 474/133, 134, 136, 137

[56] References Cited

U.S. PATENT DOCUMENTS

| | | | |
|---|---|---|---|
| 81,285 | 8/1868 | Patton | 474/134 X |
| 308,588 | 11/1884 | Yagn | 474/134 X |
| 518,314 | 4/1894 | Egger et al. | 474/134 X |
| 2,900,831 | 8/1959 | Wilson et al. | 474/134 X |
| 3,103,125 | 9/1963 | Dutro et al. | 474/134 |

*Primary Examiner*—Thuy M. Bui

*Attorney, Agent, or Firm*—Ernest A. Beutler

[57] ABSTRACT

A valve operating mechanism for a high performance internal combustion engine including a flexible transmitter drive for the camshaft that includes a toothed belt. A timing retention sprocket is juxtaposed to one of the sprockets that is interengaged with the belt and which provides a positive drive therebetween in such a location as to prevent the teeth of the sprocket and belt from coming out of engagement.

7 Claims, 2 Drawing Sheets

Figure 2
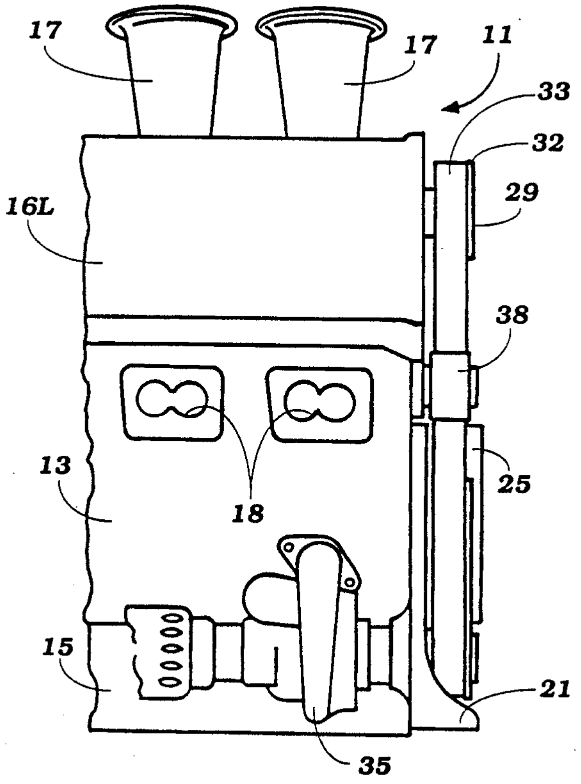
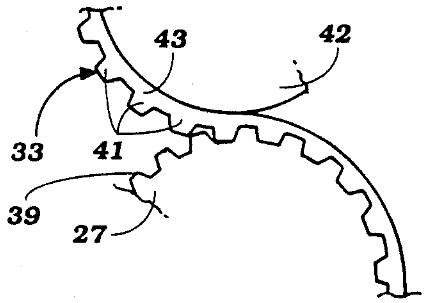
Figure 3

VALVE OPERATING SYSTEM FOR ENGINE

BACKGROUND OF THE INVENTION

This invention relates to a valve operating system for an engine and more particularly to an improved camshaft drive for an internal combustion engine.

Various camshaft driving arrangements have been proposed for internal combustion engines. One of the most popular drive arrangements for driving the camshafts of an engine from the crankshaft includes the use of flexible transmitters such as chains, toothed belts or like. In connection with such flexible transmitters, it is the normal practice to employ a tensioner pulley or sprocket that engages the flexible transmitter and holds it under tension so as to avoid it from becoming displaced from the driving sprocket. It is important that the transmitter does not become disengaged from the driving sprocket because such disengagement can change the effective timing of the valve events in relation to the crankshaft position. Although some small variations can be accommodated in low performance engines, a variation in the timing can not only adversely effect engine performance but can cause damage to the engine if the timing becomes so displaced that the head of the piston contacts the heads of the valves. This problem is much more acute in high performance engines embodying high compression ratios and low combustion chamber clearances.

In addition, the tensioner mechanism normally operates on the return or loose side of the flexible transmitter so as to insure against loss of timing. However, in certain engines and particularly high performance engines, it is not uncommon for the engine to turn briefly in a reverse direction when it is turned off. Under this condition, the normal tensioner mechanism will not insure against loss of timing and the timing drive may jump a cog when such reverse rotation occurs with the aforenoted detrimental effects.

It should be noted that the described problem has been discussed in conjunction with all types of flexible transmitters. The problem is more acute with respect to the use of toothed belts than it is with chains, however, the problem can occur with either type of drive.

It is, therefore, a principal object of this invention to provide an improved valve operating system for an engine wherein it is insured that the valve timing will not jump out of phase regardless of the engine operating condition.

It is a further object of this invention to provide an improved tensioning and related mechanism for the flexible transmitter of a camshaft drive.

It is a further object of this invention to provide a timing control mechanism for a camshaft drive that will insure that the drive does not get out of time during any running condition of the engine, be it normal or abnormal.

SUMMARY OF THE INVENTION

This invention is adapted to be embodied in a flexible transmitter drive for the camshaft of an internal combustion engine that comprises a sprocket and a flexible transmitter engaged with the sprocket. The flexible transmitter and sprocket have interengaging members for transmitting a positive drive therebetween. In accordance with the invention, a timing retaining member is juxtaposed to the sprocket and the backside of the flexible transmitter in a position to prevent the interengaging members of the sprocket and the flexible transmitter for moving out of engagement.

BRIEF DESCRIPTION OF THE DRAWINGS

FIG. 2 is a partial side elevational view of the engine.

FIG. 3 is an enlarged view of the area encompassed by the circle 3 is in FIG. 1 and shows the timing retention device.

DETAILED DESCRIPTION OF THE PREFERRED EMBODIMENT OF THE INVENTION

Figure 1:
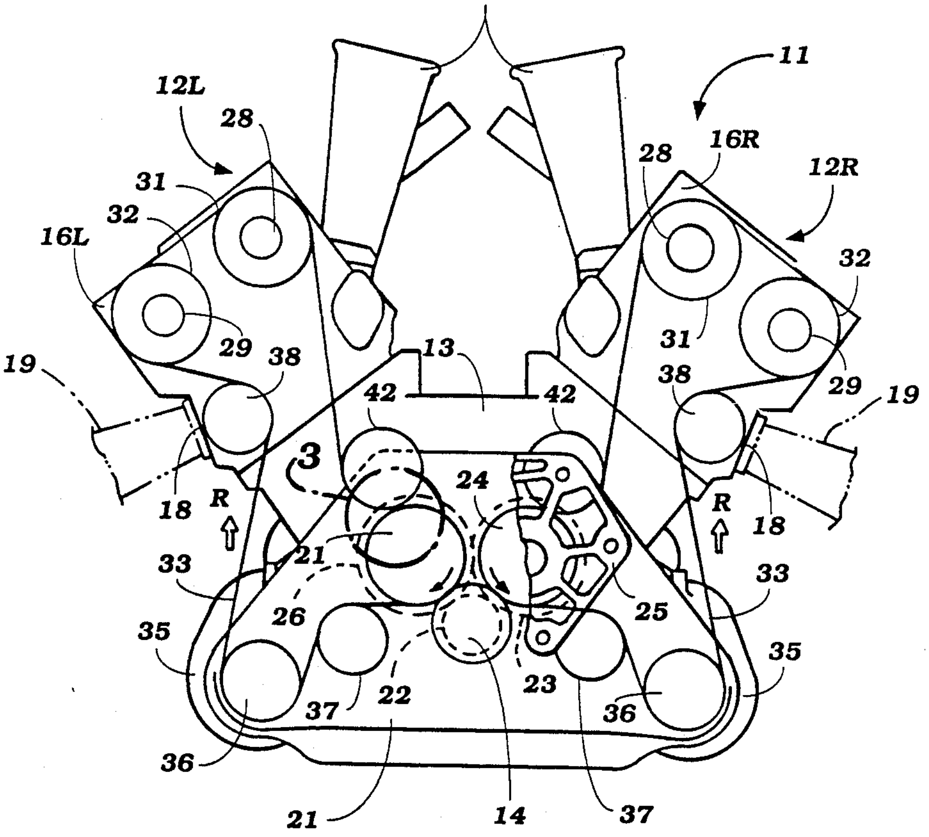
FIG. 1 is a rear elevational view of an internal combustion engine constructed in accordance with an embodiment of the invention.

Referring now in detail to the drawings, an internal combustion engine having an timing arrangement constructed in accordance with an embodiment of the invention as identified generally by the reference numeral 11. In the illustrated embodiment, the engine 11 is of the high performance type because the invention has particular utility with such high performance engines in which there is provided a high compression ratio and low clearance volume that can present the aforenoted problems. It is to be understood, however, that the invention may be utilized in conjunction with other types of engines. Also, except for the construction of the camshaft driving arrangement, the construction of the engine 11 as described is only that of a preferred embodiment and that the basic engine in which the invention is practiced may be of any of a wide variety of types.

In the illustrated embodiment, the engine 11 is depicted as being of the V type and is comprised of a pair of cylinder banks 12L and 12R that are disposed at an angle to each other. In the illustrated embodiment, the engine 11 is of the V-8 type in which the cylinder banks 12L and 12R are disposed at a 90° angle to each other. As has been previously noted, however, the engine configuration may vary without departing from the spirit and scope of the invention.

The cylinder banks 12L and 12R are defined in part by a cylinder block assembly 13 which has angularly disposed cylinder bores in which pistons are slidably supported. The pistons are connected by means of connecting rods in a known manner so as to drive a crankshaft 14 that is journaled between the cylinder block 13 and a crankcase 15 that is affixed to the cylinder block in a known manner. A left-hand cylinder head 16L is affixed to the left-hand bank of the cylinder block 13 and a right-hand cylinder head 16R is affixed to the right-hand cylinder bank of the cylinder block 13 so as to complete the cylinder banks 12L and 12R respectively.

The engine 11 is provided with an induction system that includes inlet air trumpets 17 that deliver an air charge to the individual cylinders of the cylinder banks 12L and 12R. In addition, the engine 11 is provided with a port type of fuel injection system (not shown) that injects fuel into the inlet air charge.

There is also provided an exhaust system including exhaust ports 18 on the outboard side of the cylinder banks 12L and 12R and which discharge exhaust gases into an appropriate exhaust system 19. As has been previously noted, these basic components of the engine are not a portion of the invention and, for that reason, a detailed description of them is not believed to be necessary.

In accordance with the invention, there is provided at one end of the engine a front cover assembly 21 that covers a timing gear mechanism for transferring drive from the crankshaft 14 to a pair of camshaft drive shafts, to be described. This timing mechanism includes a crankshaft timing gear 22 that is affixed for rotation with the crankshaft 14 within the front cover 21 and which is enmeshed with a first timing gear 23. The timing gear 23 is journaled within the front cover 21 and drives a first timing sprocket 24 that is disposed externally of the front cover 21 but which is partially enclosed within a timing belt cover 25. The first timing gear 23 is enmeshed with a second timing gear 26 that is also journaled within the front cover 21 but which is spaced axially from the crankshaft drive gear 22 so that the timing gear 26 will rotate in an opposite direction from the timing gear 23. A second camshaft driving sprocket 27 is affixed to the shaft which carries the timing gear 26 and which is disposed externally of the front cover 21 but within the timing belt cover 25.

An inlet camshaft 28 is journaled in the cylinder head 12R and operates the inlet valves of this cylinder head in a known manner. In a like manner, an exhaust camshaft 29 is journaled in the cylinder head 12R and operates the exhaust valves of this cylinder head in a known manner. The inlet and exhaust camshafts 28 and 29 have affixed to them respective driving sprockets 31 and 32 that are driven by a first toothed timing belt 33 which is, in turn, driven by the driving sprocket 24. It should be noted that the timing sprocket 24 rotates in a counterclockwise direction and hence the flight of the timing belt 33 running from the sprocket 24 to the sprocket 31 is the tension or drive side of the belt, while the portion of the belt 33 running from the sprocket 32 back to the drive sprocket 24 is the return side.

It should be noted that there is provided a first water pump 35 that is disposed at the right hand side of the engine and which is also driven by a sprocket 36 from the timing belt 33. It is not necessary that the water pump be driven by the timing belt 33, but the location of the water pump 35 makes it convenient to drive it from the timing belt. Also, as should be readily apparent, it is not necessary that the water pump 35 be driven by a positive drive arrangement and this is chosen only to permit simplicity of the engine.

A first idler sprocket 37 is engaged with the backside of the first timing belt 33 between the drive sprocket 24 and the water pump drive sprocket 36 so as to redirect and tension the belt 33. In a similar manner, an idler sprocket 38 is engaged with the portion of the belt 33 running from the water pump drive sprocket 36 to the exhaust camshaft drive sprocket 32 for similar purposes. One or both of the idler pulleys 37 and 38 may be adjustable so as to maintain the desired tension in the belt 33.

The left-hand cylinder belt 12L is provided with intake an exhaust valves that are operated by intake and exhaust camshafts and a water pump, all of which are driven by a drive belt arrangement similar to that of the right-hand cylinder bank as already described. Because of this, these components have been identified by the same reference numeral. It is to be understood, however, that the drive belt 33 associated with the cylinder bank 12L is driven by the drive sprocket 27 while the drive belt 33 associated with the right-hand cylinder bank 12R is driven by the drive sprocket 24. Because of the opposite rotation of the drive sprockets 24 and 27, the belts 33 associated with the cylinder banks will rotate in the opposite directions and the direction of travel is indicated by the arrows R. This opposite rotation permits the various idler sprockets already described to be located at the same locations on the engine.

It is to be understood that the construction of the drive belt arrangement as thus far described may be considered generally to be conventional. However, this presents certain problems as aforenoted and which may be best understood by reference to FIG. 3. In this figure, which is typical of the arrangement associated with each of the drive sprockets 27 and 24, the drive sprocket 27 is illustrated. As seen in this figure, the drive sprocket 27 has outwardly projecting lugs or teeth 39 which cooperate with corresponding lugs or teeth 41 formed on the drive belt 33 so as to provide a positive drive. The use of the tensioner pulleys 37 and 38 will tend to insure that there will be sufficient tension and area of contact to avoid the teeth 39 and 41 from becoming disengaged. However, under extreme adverse conditions such as may occur only in high performance or racing engines, there is a possibility that the teeth 39 and 41 may become disengaged, for example if the engine rotates briefly in a reverse direction due to the stoppage of the high compression engine. Even if the teeth jump out of engagement by only one tooth, this will not cause any significant problems with conventional engines. However, with high performance engines, such a loss of timing can be detrimental.

In order to insure that the teeth 39 and 41 cannot become out of engagement and lose timing, a timing retention sprocket 42 is disposed on the backside of the drive belt 33 adjacent one of the sprockets associated with this belt. In the specific preferred embodiment shown, the timing retention sprocket 42 is juxtaposed to the driving sprockets 24 or 27, depending on the belt involved, and engage a portion 43 of the belt 33 immediately adjacent the sprocket 27. The spacing is such that the timing retention sprocket 42 will prevent the timing belt 33 and its teeth 41 from moving out of engagement with the teeth 39 of the drive sprocket 27. As a result, there can be no loss of timing with this arrangement. It should be noted that the sprocket 42 can also serve the function of redirecting the belt in the area 43 however, this is not critical to the practicing of the invention.

It should be readily apparent from the foregoing description, that a relatively simple and yet highly effective arrangement has been provided so as to insure that a camshaft driving mechanism embodying a flexible transmitter cannot get out of time even under the most adverse conditions. Although an embodiment of the invention has been illustrated and described, various changes and modifications may be made without departing from the spirit and scope of the invention, as defined by the appended claims.

I claim:

1. In a flexible transmitter drive for the camshaft of an internal combustion engine comprising a sprocket, a flexible transmitter engaged with said sprocket, said flexible transmitter and said sprocket having interengaging members for transmitting a positive drive therebetween, the improvement comprising a timing retaining member juxtaposed to said sprocket on the backside of said flexible transmitter and engaged therewith in a position to prevent the interengaging members of said sprocket and said flexible transmitter from moving out of engagement.

2. In a flexible transmitter drive as set forth in claim 1 wherein the interengaging members are respective teeth.

3. In a flexible transmitter drive as set forth in claim 2 wherein the timing retention member is spaced from the crests of the teeth of the sprocket a distance not significantly greater than the height of the teeth.

4. In a flexible transmitter drive as set forth in claim 3 wherein the timing retention member comprises an idler sprocket.

5. In a flexible transmitter drive as set forth in claim 1 wherein the flexible transmitter is a toothed belt.

6. In a flexible transmitter drive as set forth in claim 5 wherein the timing retention member is spaced from the crests of the teeth of the sprocket a distance not significantly greater than the height of the teeth.

7. In a flexible transmitter drive as set forth in claim 6 wherein the timing retention member comprises an idler sprocket.

* * * * *